(12) United States Patent
Rauma et al.

(10) Patent No.: US 9,118,696 B2
(45) Date of Patent: Aug. 25, 2015

(54) METHOD, DATA TRANSFER ARRANGEMENT, SERVER AND TERMINAL DEVICE FOR UPDATING INFORMATION IN A TERMINAL DEVICE

(75) Inventors: Tapio Rauma, Oulu (FI); Jukka Koutaniemi, Oulu (FI); Ari Parkkila, Oulu (FI)

(73) Assignee: CAPRICODE OY ET AL., Kempele (FI)

( * ) Notice: Subject to any disclaimer, the term of this patent is extended or adjusted under 35 U.S.C. 154(b) by 0 days.

(21) Appl. No.: 13/224,766

(22) Filed: Sep. 2, 2011

(65) Prior Publication Data

US 2011/0320519 A1    Dec. 29, 2011

Related U.S. Application Data

(63) Continuation of application No. 11/015,630, filed on Dec. 17, 2004, now abandoned.

(30) Foreign Application Priority Data

Dec. 18, 2003    (FI) ...................................... 20031862

(51) Int. Cl.
*G06F 17/30*    (2006.01)
*H04L 29/08*    (2006.01)
*G06F 9/44*    (2006.01)

(52) U.S. Cl.
CPC .............. *H04L 67/1095* (2013.01); *G06F 8/71* (2013.01); *H04L 67/04* (2013.01)

(58) Field of Classification Search
CPC ............ G06F 11/14; G06F 8/71; G05B 15/02

USPC ......... 707/610, 611, 613, 617, 618, 624, 640, 707/661, 674, 999.203–204; 709/248; 705/59

See application file for complete search history.

(56) References Cited

U.S. PATENT DOCUMENTS

| | | |
|---|---|---|
| 5,023,907 A | 6/1991 | Johnson et al. |
| 5,276,871 A | 1/1994 | Howarth |
| 5,579,479 A | 11/1996 | Plum |
| 5,671,412 A | 9/1997 | Christiano |

(Continued)

FOREIGN PATENT DOCUMENTS

| | | |
|---|---|---|
| EP | 1 049 006 | 11/2000 |
| EP | 1 227 396 | 7/2002 |

OTHER PUBLICATIONS

Jonsson et al., "SyncML—Getting the Mobile Internet in Sync," Ericsson Review No. 3 (2001).

*Primary Examiner* — Syling Yen
(74) *Attorney, Agent, or Firm* — Volpe and Koenig, P.C.

(57) ABSTRACT

The invention relates to a method and data transfer arrangement for synchronizing information comprised by an application program in a client device. In the method, information comprised by an application program in the client device is updated from a media server maintaining up-to-date information. In addition, the data transfer arrangement comprises a separate license server, which contains two separate license files: the first license file and the second license file. The up-to-date status of information in the client device can be ensured by means of the first license file. The second license file comprises information by which the update required by the client device can be retrieved from a media server maintaining up-to-date information.

20 Claims, 3 Drawing Sheets

(56) References Cited

U.S. PATENT DOCUMENTS

| | | |
|---|---|---|
| 5,708,709 A | 1/1998 | Rose |
| 5,742,820 A | 4/1998 | Perlman et al. |
| 6,023,766 A | 2/2000 | Yamamura |
| 6,049,670 A | 4/2000 | Okada et al. |
| 6,260,141 B1 | 7/2001 | Park |
| 6,496,977 B1 | 12/2002 | Hamilton et al. |
| 6,502,124 B1 | 12/2002 | Shimakawa et al. |
| 6,510,466 B1 | 1/2003 | Cox et al. |
| 6,678,741 B1 * | 1/2004 | Northcutt et al. ............. 709/248 |
| 6,708,157 B2 * | 3/2004 | Stefik et al. .................. 705/59 |
| 2003/0097433 A1 | 5/2003 | Park et al. |
| 2003/0221189 A1 * | 11/2003 | Birum et al. .................. 717/170 |
| 2004/0025053 A1 * | 2/2004 | Hayward ...................... 713/201 |
| 2006/0018454 A1 | 1/2006 | Nonaka et al. |

\* cited by examiner

```xml
<?xml version="1.0" encoding="ISO-8859-1"?>
<ApplicationLicense>
    <Licensee>V-tech</Licensee>
    <ValidFrom>20030318</ValidFrom>
    <ValidTo>20031231</ValidTo>
    <ApplicationFile>NG_GAME_CHESS.application</ApplicationFile>
    <ApplicationCount>200</ApplicationCount>
</ApplicationLicense>
```

FIG. 3a

```xml
<?xml version="1.0" encoding="ISO-8859-1"?>
<Application>
<Name>NG_GAME</Name>
<Version>Chess</Version>
<Directory>N3650/NG</Directory>
<ReleaseNote>
Testing MIDP-installation

</ReleaseNote>
<Download>chess-128.jad</Download>
<Download>chess-128.jar</Download>
</Application>
```

METHOD, DATA TRANSFER ARRANGEMENT, SERVER AND TERMINAL DEVICE FOR UPDATING INFORMATION IN A TERMINAL DEVICE

CROSS REFERENCE TO RELATED APPLICATION(S)

This application is a continuation of U.S. patent application Ser. No. 11/015,630, filed Dec. 17, 2004, which claims priority to Finland Application No. 20031862 filed Dec. 18, 2003 which are incorporated by reference as if fully set forth.

FIELD OF INVENTION

The invention relates to a method for synchronizing information comprised in an application program in a client device, in which method information comprised in an application program in a client device is updated from a server maintaining up-to-date information. The invention also relates to a data transfer arrangement, in which the method is utilized. In addition, the invention relates to a license server and a mobile terminal device included in the data transfer system. Furthermore, the invention relates to software means for implementing the method.

BACKGROUND

Information available to people becomes easily dispersed to different devices and information systems. Part of the information available can be located in files in fixed networks on servers or personal computers, for example. On the other hand, terminal devices of various cellular networks, laptop computers or palm computers contain information, files and programs that are important to the user. Maintaining them in a way that the latest created version of each piece of information, file or program is always the one currently in use, is a challenging task. The updating and at the same time unifying of information, files and programs in different devices is generally called synchronization of data.

One possible way of performing synchronization is for the user to perform it separately on each device. Although data transfer from one device and information system to another can function entirely electronically, it always requires action from the user in this case. The user must remember to synchronize the information of different devices frequently enough. If synchronization is not performed often enough, the user can end up in a situation in which there are too many differences in the information contained by different information systems. In the worst case, the user does not know which one of the files is the latest and/or most correct. Possibly it can be checked from the creation date of the information, but it is a laborious way, especially if there are a large number of files to be checked. Besides, the latest creation date of the file does not always ensure the correctness of all information, if information is maintained in more than two devices or files.

A subroutine included in the program, which reminds of the updates, is utilized in the updating of computer software. It can be called a program-specific reminder. This reminder gives the user an update prompt when a sufficient number of days has passed since the previous prompt or update. The user can usually either accept the update or reject it. In some types of software, such a slow manner of updating is sufficient. Such softwares are, for example, various text, image or presentation softwares.

However, there are types of information, files and software in which correctness and currentness are desirable properties. Examples of such files and programs are various personal calendars and virus protection programs. They are useful to the user only when the information contained by them complies with the latest supplementary information that exists about them. There are many sad examples of deficiencies in the updating of virus protection programs. Because of the deficiencies of virus protection programs especially in mobile, wireless devices, entire company networks have become so badly contaminated that they have had to be closed down in order to destroy the viruses and worms spread in the network. Such an event is bad publicity for the company whose network has to be closed down even for a short time because of a virus problem in it.

In principle, it would be possible to update the information, file or software in the terminal device always when the terminal device is started. However, this solution increases the need for data transfer so much that especially in wireless data transfer systems, the limited data transfer capacity becomes a problem. Then the program in the terminal device starts slowly, because transferring the updated version to the terminal device is slow through a limited data transfer channel. The slowness of the data transfer channel is further increased by the transfer of unnecessary updates to such terminal devices, which already have the latest updated version of the information, file or program.

The above examples illustrate the importance of managing up-to-date information in the prior art information networks. This is particularly true in the management of information and softwares contained by various mobile devices. Such management of information and files is generally called Software Management. Software management has the following characteristics, for example: One terminal device or server can remote control at least one other device by it. It can also be used for complementing a program or a part of it in some terminal device by new information or parts of the program located in another device. The existence of the licenses, or rights of use for the programs are also managed by it. Software Management can also comprise matters related to Digital Right Management.

Open Mobile Alliance (OMA) has published specifications, which concern the updating and maintenance of software in mobile devices. The specifications OMA DM (Device Management) and OMA DS (Data Synchronization) describe some possible ways of implementing data transfer and up-to-date file maintenance in mobile devices. These specifications describe the SynchML (Synchronization Mark up Language) protocol and how it is utilized in the actual implementation of synchronization. However, the standards do not define how the starting of the synchronization could be implemented without any action from the user as a kind of automatic operation, when the application is started in the mobile terminal.

A good and simple software management procedure could thus make it easier to maintain and use programs in information networks and especially in various mobile terminal devices. By it, most software updates could be carried out as remote work of IT personnel or entirely without their contribution. In addition, a good software management procedure could use the data transfer network so that it would not stress the data transfer network by unnecessary file transfer.

SUMMARY

It is the object of the present invention to provide a method and data transfer arrangement by which it is always possible to use the most up-to-date version of some piece of information, file or program used in a mobile terminal, but without putting unnecessary stress on the limited mobile data transfer network serving the terminal device.

The objects of the invention are achieved by a procedure in which at the beginning of a program started in the terminal device, the terminal device is notified whether it is using an up-to-date piece of information, file or program or not. In order to obtain this information, the terminal device sends a query to another device maintaining up-to-date information. This other device answers the query sent by the terminal device. The information indicating the up-to-date status is transmitted by a special first license file maintained by the other device. Only in the case that this first license file indicates that there is old information, an old file or an old program in the terminal device that made the query, the actual updating of the information, file or program is started. The updating is carried out as a separate measure from a device address indicated by the other license file according to the invention, which can be called the application file.

The method and data transfer arrangement according to the invention have the advantage that it is possible to use up-to-date information, files or programs in a mobile terminal always after the starting of a certain application, when desired.

In addition, the invention has the advantage that the limited mobile data transfer channel is not overloaded by the updating files being transferred.

The invention also has the advantage that the procedures according to the OMA DS and OMA DM specifications can be utilized in the updating of information, files and programs.

A further advantage of the information is the fact that the updating of the information/files can be started without explicit action required from the user.

The invention also has the advantage that the user need not remember the device address of the device maintaining the update file.

Yet another advantage of the invention is the fact that the user can also prevent the updating from taking place, if it is not wanted.

Furthermore, the invention has the advantage that after the user has given the permission to update, the files/information in the device are updated without any further action from the user.

In addition, the invention has the advantage that the memory capacity required by the procedure both in the terminal device and the other device maintaining the updating is small.

The method according to the invention for synchronizing information in the client device is characterized in that starting an application program or synchronization starting application in a client device causes checking of the up-to-date status of information comprised by an application program in the client device from a separate other license server before said information is taken into use in the application program.

The data transfer arrangement according to the invention is characterized in that the starting of an application program or synchronization starting application in the client device has been arranged to cause checking of the up-to-date status of the information in the application program of the client device from a separate license server before said information has been arranged to be taken into use in said application program.

The license server according to the invention is characterized in that it comprises an up-to-date first license file and a second up-to-date license file, by means of which the up-to-date status of the application program in the client device can be checked and updated.

The terminal device of a data transfer network according to the invention is characterized in that the terminal device comprises a) means for starting the synchronization of information comprised in an application
b) program to be started in a terminal device, which means have been arranged to send a synchronization starting message to a license server, which synchronization starting message comprises information concerning the up-to-date status of the application program to be started, and
c) means for processing the reply message sent by the license server, which message comprises the information of the up-to-date first license file and either the information of the second license file or a synchronization acceptance message.

Some preferred embodiments of the invention are presented in the dependent claims.

The basic idea of the invention is the following: A second device maintaining up-to-date license information/files according to the invention, a license server according to the invention, advantageously comprises two license files. The first license file comprises the following information, for example: license holder information, time of validity of the license and restrictions on use of the license. The second license file comprises the following information, for example: the name and the version number of the license, information of the path from which the information, file or program can be retrieved, information about the objects to be downloaded and possibly various release notes.

The procedure according to the invention is started when the mobile terminal device requests the checking of the status of the information in its own license file by sending the request to the server maintaining the license information The checking request can be sent either by the actual application program to be started or by a separate synchronization starting program to be started separately. The license server according to the invention, which received the checking request, checks the first license file it received from the mobile terminal device that sent the request. If the information of this received, first license file differs from the corresponding first license information on the license server, it is necessary to update the mobile terminal device. Then the license server sends to the terminal device that asked for the checking the updated first license file and the second license file according to the invention, by using which the terminal device that made the checking request can retrieve an updated version of the information, file or program.

If it is not necessary to update the information, files or program of the terminal device, only the first license file according to the invention is sent to the terminal device that made the checking query. Thus the terminal device that made the query knows in each case whether it is using an up-to-date version of the information, files or program or not. The license files to be transferred are so small that the load caused by them on the data transfer network does not have an effect on the performance of the network.

BRIEF DESCRIPTION OF THE DRAWING(S)

In the following, the invention will be described in more detail. Reference will be made to the accompanying drawings, in which.

DETAILED DESCRIPTION OF THE PREFERRED EMBODIMENT(S)

Figure 1:
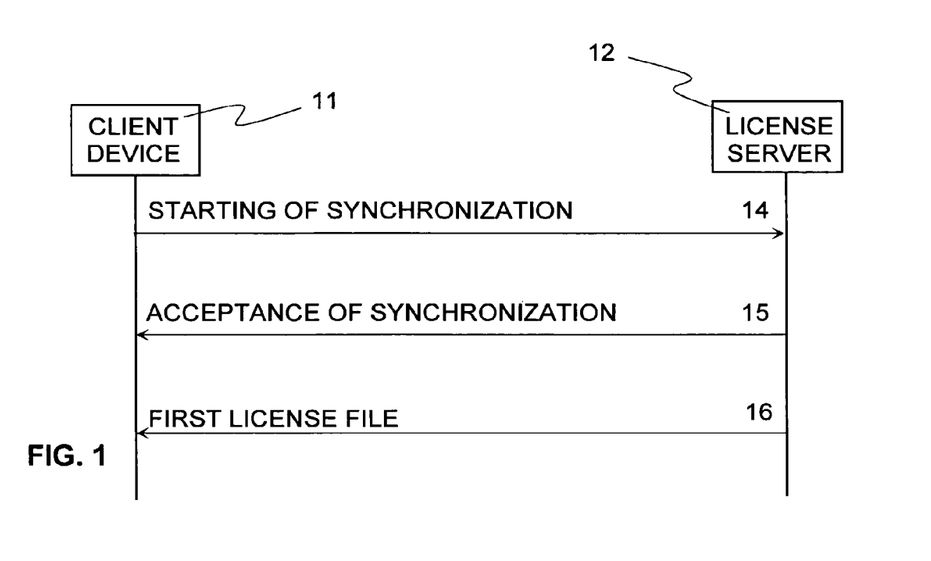
FIG. 1 is an exemplary signal chart of the steps of the procedure according to the invention in a client-server environment.

FIG. 1 depicts, as an exemplary signal chart, the main steps of the method according to the invention. In the example of FIG. 1, the license server 12 maintains up-to-date license files according to the invention: the first license file and the second license file. The first license file comprises the following license information, for example: the holder of the license, time of validity of the license and possible restrictions on use of the license. The second license file comprises information needed in the actual implementation of the synchronization, such as: the name and version number of the license, path to the device address from which the update of the file or program can be retrieved, and information about the content of the object to be updated. In addition, this second license file can comprise various additional information about the release. This second license file can also be called the update application file.

The information synchronization procedure according to the invention is started when an application program, to which the checking routine according to the invention has been added, is started in a client device 11 belonging to some data transfer network. Alternatively, the client device 11 has a separate synchronization starting application, the activation of which starts the synchronization procedure according to the invention. The client device 11 can be, for example, a terminal device of a cellular network, a WLAN terminal device, a PDA or a palm computer. The data transfer network can be some wireless data transfer network. When either of the above mentioned application programs in the client device 11 is started, the client device 11 sends a synchronization starting message 14 to the license server 12. This message comprises the information according to the first license file in the form in which it has been saved in the client device 11: the holder of the license, time of validity of the license and restrictions of the license.

The license server 12 checks the information of the first license file in the starting message 14 it received. If the license file contained by the starting message 14 is equivalent to the information contained by the corresponding first license file in the license server 12, the license server 12 sends a synchronization acceptance message 15 and a message 16 containing the information of the valid first license file to the client device 11, which asked for the synchronization. The synchronization acceptance message 15 notifies the client device 11 that it has the newest updated version of the application program to be started or the information/file needed by it. If the status of the client device 11 is such as described above, no further data transfer between the license server 12 and the client device 11 is needed, and the client device 11 can start using the actual application program.

Figure 2:
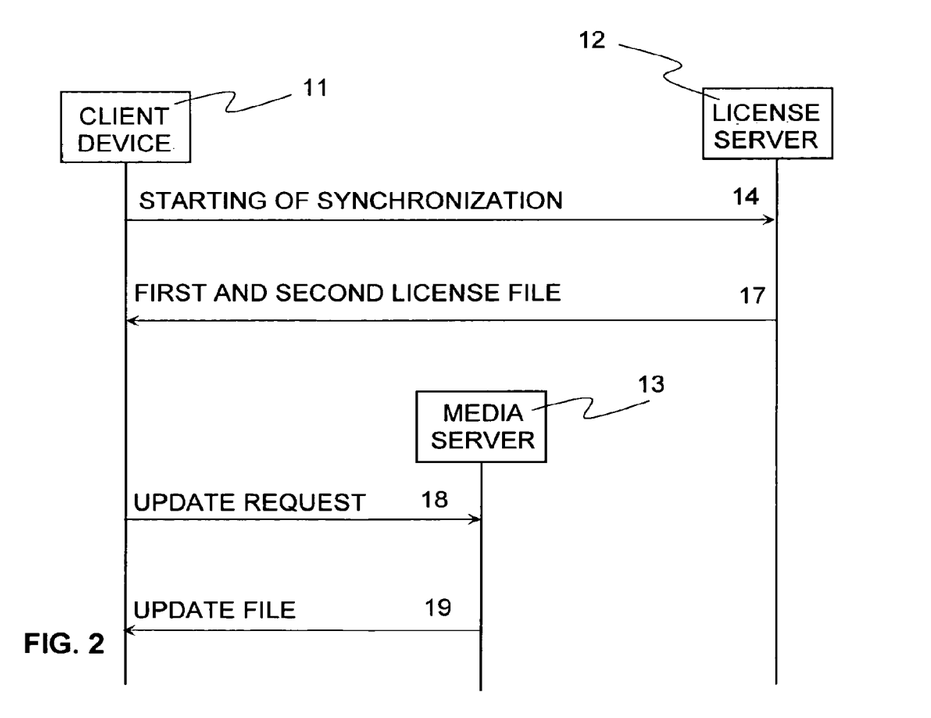
FIG. 2 is an exemplary signal chart of the-updating of information taking place through the procedure according to the invention.

However, if the license server 12 finds out that the synchronization starting message 14 received by it contains the first license file according to the invention, the information of which differs from the information in its own first license file, the operation follows the example of FIG. 2. In FIG. 2, the client device 11 sends an ordinary synchronization starting message 14. The license server 12 finds out that the information of the first license file held by it differs from the first license file contained by the synchronization starting message 14 it received from the client device 11. In this situation, the license server 12 sends both valid license files according to the invention to the client device 11, reference 17. Because the client device 11 does not receive the synchronization acceptance message 15 in this case, it knows that it has to update the information, file or program held by it on the basis of the information contained by the second license file received by it. In an advantageous embodiment of the invention, the user of the client device 11 can be asked for permission to carry out the actual updating at this stage. In another advantageous embodiment of the invention, an update permission of permanent nature can also be given in connection with any updating.

If the permission to carry out the updating has been obtained from the user or it is of permanent nature, the client device 11 sends the actual request to update the information, file or program 18 to a media server 13, the device address of which has been included in the second license file according to the invention, received by the client device 11 from the license server 12. As a reply to the update request 18 received, the media server 13 sends the update information 19 to the client device 11 in the form defined by the OMA DM specification, for example. In the client device 11, the updating is carried out in the manner described by the update file sent by the media server 13. After the updating carried out, the information, files and programs used by the client device 11 are up to date.

Figure 3A:
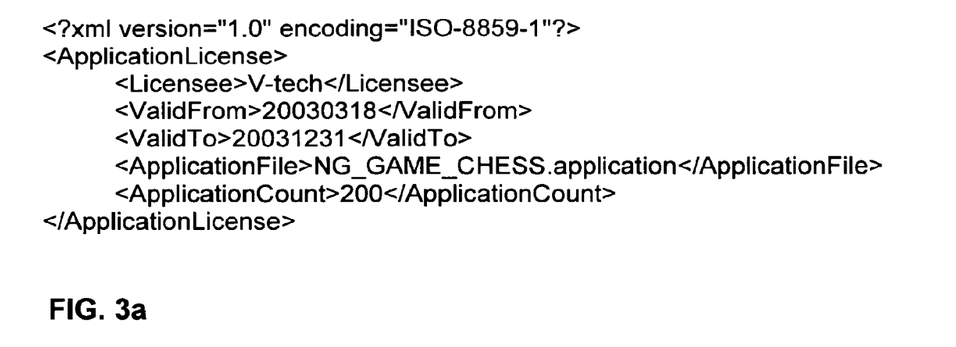
FIG. 3a shows the information content of the first license file according to the invention by way of example.
Figure 3B:
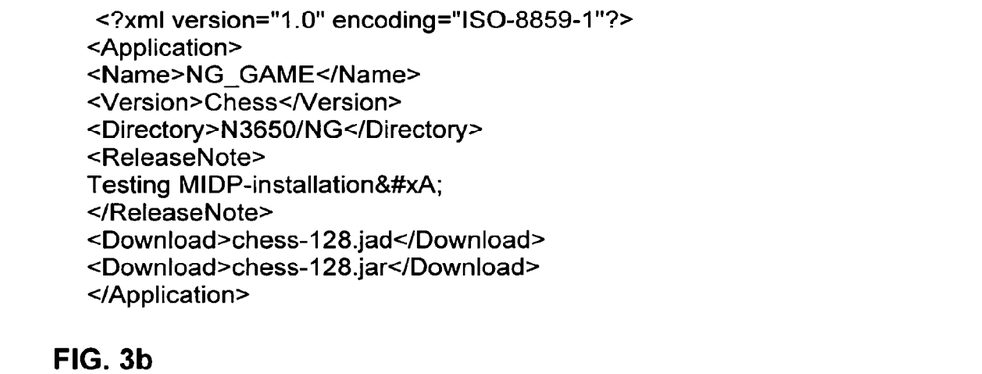
FIG. 3b shows the information content of the second license file according to the invention by way of example.

In FIGS. 3a and 3b, it is shown by way of example in which form the information comprised in the first and the second license file can be transmitted. FIG. 3a shows, as an example, the information comprised by the first license file in one exemplary case. In the example of FIG. 3a, the licensee is V-tech, the license is valid from 18 Mar. to 31 Jan. 2003 and it concerns the NG-GAME-CHESS application. This information comprised by the first license file according to the invention is sufficient to ensure the up-to-date status of the information, file or application program used by the client device 11.

FIG. 3b shows an example of the case when the license server 12 has found out that the synchronization starting message 14 sent by the client device 11 contains outdated information of the first license file. So the license server 12 sends the valid information of the first and the second license file according to the invention, indicated by reference 17. The second license file comprises the information shown in FIG. 3b, for example: the name of the information, file or application to be updated, the version number, the search path of the update file, a description of the file to be transferred because of the updating and additionally some other information about the release.

In the client device 11 and license server 12 used, the operation according to the invention requires an application program, the size of which in the license server 12 is in the order of 100 kB and in the client device under 100 kB. In the license server 12, the application according to the invention can advantageously be implemented as a Java 1.2 program. A program based on Java 1.2 can also be applied in the client device 11. However, in some client devices 11, like terminal devices of a cellular network, the program according to the invention can also be implemented as a Symbian C++ program.

Figure 4:
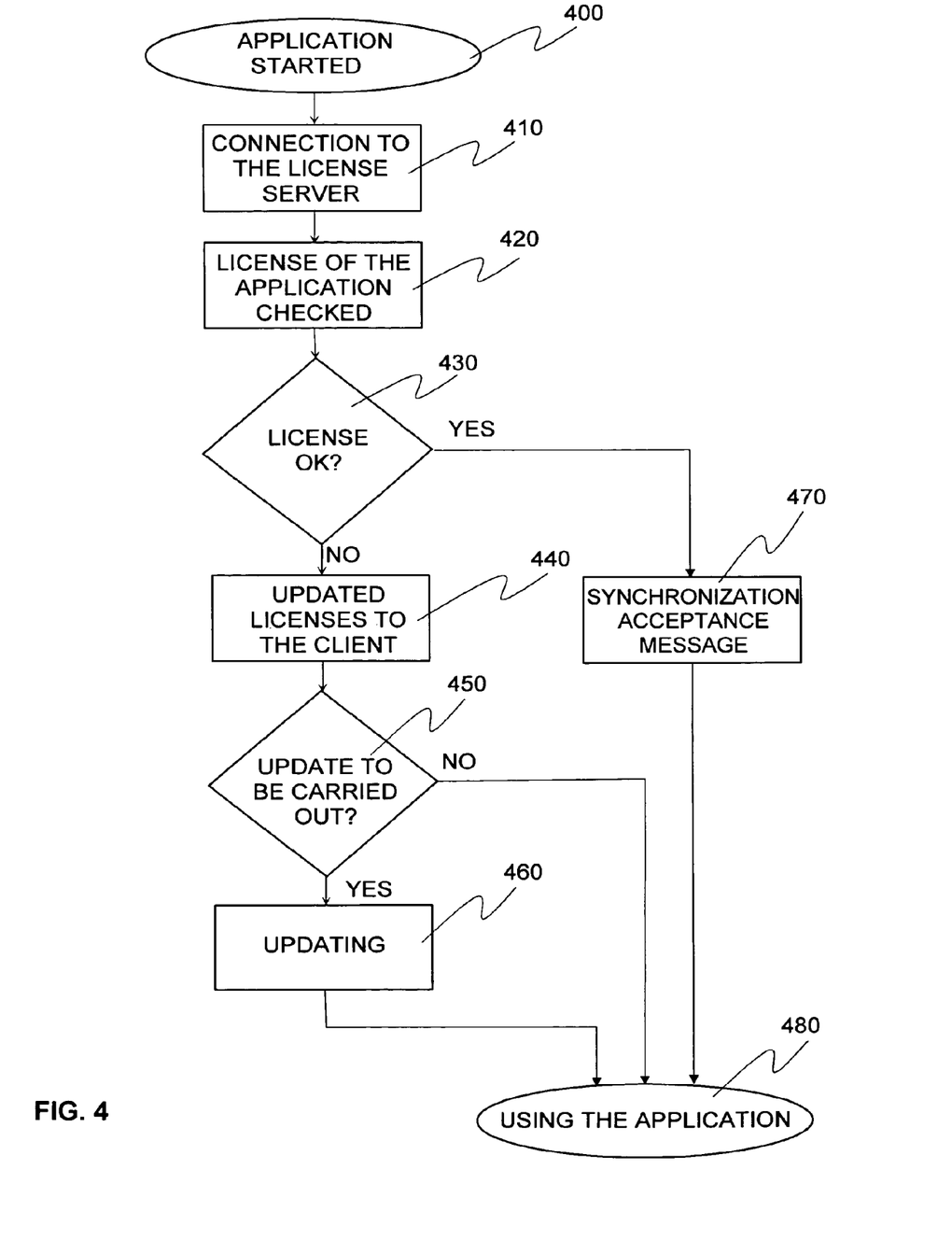
FIG. 4 shows, as an exemplary flow chart, the main steps of the method according to the invention.

In FIG. 4, the main steps of the method used in the synchronization of information according to the invention are shown as an exemplary flow chart. The features of the invention shown in FIGS. 1 and 2 are also utilized in connection with the description. In step 400, the user of the client device 11 starts an application program, which can be either a certain utility application or a separate synchronization starting application. In both cases, when starting has taken place, the client device 11 sends a synchronization starting message 14 to a license server 12 maintaining up-to-date license information according to the invention, step 410. The information comprised by the synchronization starting message 14 has been described above in connection with FIGS. 1 to 3.

In step 420, the license server 12 compares the information of the first license file contained by the synchronization starting message 14 to the information of its own, up-to-date first license file. In step 430, it is decided whether the information of the received first license file and the up-to-date first license file are equivalent or not. If these first license files are equivalent, the license server 12 sends a synchronization acceptance message 15 and the information 16 of the valid first license file to the client device 11 in step 470. The synchronization acceptance message 15 tells the client device 11 that it is using an up-to-date piece of information, file or program. The payload application in the client device 11 can thus be started at once, step 480.

In step 430, the comparison result can be "NO", which means that the first license file sent by the client device 11 in the synchronization starting message has contained old information. In that case, in step 440, the license server 12 sends both valid pieces of information of the first and the second license file according to the invention to the client device 11, reference 17. The absence of the synchronization acceptance message 15 thus indicates to the client device 11 that update information can be retrieved by utilizing the information of the second license file.

In step 450, the user of the client device 11 is advantageously given the possibility to prevent retrieving the update. This possibility can be useful when the update file to be transferred is so large that its transfer will take a long time. If the user prevents the retrieval of the update, the client device 11 immediately starts the not-up-to-date application program in it, or the application program is allowed to use old information or an old file, step 480. In a preferred embodiment of the invention, the user of the client device can give an update permission of permanent nature, in which case the user is no more asked for an update permission.

If the user of the client device 11 allows the retrieval of the update offered in step 450, it is carried out in step 460. Step 460 preferably comprises both the retrieval of the update from a device address indicated by the information contained by the second license file and the installation of the retrieved update file in the client device 11. When the updating has been completed, the updated application program is started in the client device in step 480.

The method according to the invention can be implemented by software applications, the first of which is located in a server 12 maintaining an up-to-date license file, and the second in a client device 11. The first software application comprising steps 420, 430, 440 and 470 of the method according to the invention shown in FIG. 4 is preferably in the license server 12. The client device 11 advantageously includes another software application comprising steps 400, 410, 450, 460 and 480. Otherwise the client device 11 and the license server 12 comply with the prior art.

Applying the invention does not require any other structural changes of the devices participating in the file transfer. So the client device 11 and the servers 12 and 13 comprise prior art data transfer means for transmitting various messages between them. The structure and operation of these data transfer means is determined on the basis of the data transfer network used. So the only measures required for utilizing the method according to the invention are installing the above described software applications both in the client device 11 and the license server 12 used.

The procedure according to the invention can also be applied in saving the information or files to be updated into a media server 13. A case like this could be, for example, updating calendar information from a mobile client device 11 to a media server 13. In this situation, the client device 11 first presents to a license server 12 according to the invention a data synchronization request, in which the data transfer direction from the client device 11 to the servers 12 and 13 is defined as additional information. Such updating of data causes at least a change of the version number in the first license file according to the invention in the license server 12. In addition, it is also possible to define or change other information belonging to the first or the second license file according to the invention.

When the license files according to the invention has been updated on the license server 12, the actual information or file to be updated is transferred to the media server 13. The information to be transferred from the client device 11 to the media server 13 can be defined and transferred by procedures defined in an application-specific manner.

Some preferred embodiments of the method and data transfer arrangement and related devices according to the invention have been described above. The invention is not limited to the embodiments described above, but the inventive idea can be applied in numerous ways within the limits set by the claims.

What is claimed is:

1. A method for synchronizing a piece of information of an application program between a wireless client device that is in an operation mode and a media server maintaining up-to-date pieces of information of the application program, the method comprising:

indicating, in the wireless client device by a checking routine, that the application program has been started;

sending, by the wireless client device, a synchronization starting message including at least a first license file to a license server before said application program is taken into use, said first license file including at least a current status of said piece of information of the application program and a direction to be utilized in the synchronization between the wireless client device and the media server;

checking, by the license server after receiving the synchronization starting message, the up-to-date status of the received first license file of the application program;

on a condition that the status of the received first license file of the application program equals the status of the first license file of the same application program known by the license server:

sending, by the license server, a reply message to the wireless client device, wherein said reply message includes an up-to-date first license file of the application program and a synchronization acceptance message; and on a condition that the status of the received first license file of the application program does not equal the status of the first license file of the same application program known by the license server:

sending, by the license server, a reply message to the wireless client device, wherein said reply message includes an up-to-date first license file of the application program and a second license file, the second license file including at least network information by which an unsynchronized piece of information of the application program is synchronized between the wireless client device and the media server; and utilizing said application program in the wireless device.

2. The method according to claim 1, wherein the first license file comprises at least the following information of the application: a licensee, time of validity of the license and restrictions of the license.

3. The method according to claim 1, wherein the second license file comprises: a name of the information of a file or of an application to be synchronized, a version number, a search path of the file to be synchronized, a description of the file to be transferred because of the synchronizing and other release information.

4. The method according to claim 3, wherein on the condition that the wireless client device receives the second license file, then at least on a first time of synchronizing, a permission is asked to carry out the synchronizing from the media server or to the media server.

5. The method according to claim 4, wherein if the synchronizing permission has been received, the wireless client device synchronizes the information of said application program from the media server by sending a synchronizing request to which the media server replies by sending to the wireless client device the requested information for synchronizing.

6. The method according to claim 4, wherein if the synchronizing permission has been received, the wireless client device sends to the media server a synchronizing request including an indication that the media server should update said application program in the media server after the synchronization request by the information sent by the wireless client device.

7. A data synchronizing arrangement for synchronizing a piece of information between a wireless client device that is in an operation mode and a media server that is configured to maintain up-to-date pieces of information of an application program, the data synchronizing arrangement further comprising:

the wireless client device comprising:
the application program to be synchronized;
means for starting the application program;
means for sending, after indicating said starting of the application program, a synchronization starting message including at least a first license file to a license server before said application program is taken into use, said first license file including at least a current status of said piece of information of the application program before said application program is taken into use in the wireless client device and a direction to be utilized in the synchronization between the wireless client device and the media server;
means for receiving a reply message from the license server;
means for sending messages and data to the media server;
means for receiving messages and data from the media server; and
means for starting the application program after utilizing received synchronization data; and the license server comprising:
means for receiving the synchronization starting message and the first license file of the application program from the wireless client device;
means for checking the up-to-date status of the received first license file of the application program;
means for sending to the wireless client device a reply message that includes an up-to-date first license file of the application program and a synchronization acceptance message on a condition that the status of the received first license file of the application program equals the status of the first license file of the same application program known by the license server; and
means for sending to the wireless client device a reply message that includes an up-to-date first license file of the application program and a second license file on a condition that the status of the received first license file of the application program does not equal the status of the first license file of the same application program known by the license server, the second license file including at least network information by which an unsynchronized piece of information of the application program is synchronized between the wireless client device and the media server.

8. The data synchronizing arrangement according to claim 7, wherein the first license file comprises at least the following information: a licensee, time of validity of the license and restrictions of the license.

9. The data synchronizing arrangement according to claim 7, wherein the second license file comprises the following information: a name of the information, of a file or an application program to be synchronized, a version number, a search path of the file to be synchronized, a description of the file to be transferred because of the synchronizing and other release information.

10. The data synchronizing arrangement according to claim 9, wherein the wireless client device has received the second license file the wireless client device is configured to synchronize said application program from the media server by sending a synchronizing request and the media server has been configured to send to the wireless client device the requested synchronizing information.

11. The data synchronizing arrangement according to claim 9 wherein the wireless client device has received the second license file the client device is configured to synchronize said application program with the media server by sending an update request including an indication that the media server should update said application program in the media server after the synchronization request by the information sent by the wireless client device.

12. A license server for synchronizing information of an application program between a wireless client device and a media server, the license server comprising:

files concerning the application program of the wireless client device, wherein the files comprise:
an up-to-date first license file including at least a current status of a piece of information of the application program; and
a second license file including at least network information by which an unsynchronized piece of information of the application program is configured to be synchronized between the wireless client device and the media server;

means for checking information of a first license file of a received synchronization starting message from the wireless client device against the up-to-date first license file;

means for checking an indicated direction to be utilized in the synchronization between the wireless client device and the media server; and means for sending to the wireless client device a reply message that includes an up-to-date first license file of the application and a synchronization acceptance message on a condition that the status of the received first license file of the application program equals the status of the first license file of the same application program known by the license server; and means for sending to the wireless client device a reply message that includes an up-to-date first license file of the application and a second license file on a condition that the status of the received first license file of the application program does not equal the status of the first license file of the same application program known by the license server, the second license file including at least network information by which an unsynchronized piece of information of the application program is synchronized between the wireless client device and the media server.

13. The license server according to claim 12, wherein the first license file comprises at least the following information of the application: a licensee, time of validity of the license and restrictions of the license.

14. The license server according to claim 13, wherein the second license file comprises: a name of the information, of a file or of an application to be synchronized, a version number, a search path of the file to be synchronized, a description of the file to be transferred because of the synchronizing and other release information.

15. A wireless terminal of a wireless data transfer network, comprising:

means for sending, receiving and processing messages;

means for synchronizing a piece of information of an application program used in the wireless terminal between a media server;

means for indicating a starting of said application program in the wireless terminal;

means for sending a synchronization starting message including at least a first license file to a license server before said application program is taken into use, said first license file including at least a current status of said piece of information of the application program and a direction to be utilized in the synchronization between the wireless terminal and a media server;

means for processing a reply message sent by the license server on a condition that the status of the received first license file of the application program equals the status of a first license file of the same application program known by the license server, which message includes an up-to-date first license file of the application and a synchronization acceptance message;

means for processing a reply message sent by the license server on a condition that the status of the received first license file of the application program does not equal the status of a first license file of the same application program known by the license server, which message includes a second license file, the second license file including at least network information by which an unsynchronized piece of information of the application program is synchronized between the wireless terminal and the media server; and means for starting the application program after utilizing received synchronization data.

16. The wireless terminal according to claim 15, which also comprises:

means for asking the user of the wireless terminal for a synchronizing permission at least on a first time of synchronizing, if the second license file has been received; and means for synchronizing the piece of information with the media server based on the information received in the second license file.

17. The wireless terminal according to claim 15, wherein said first license file comprises at least the following information: a licensee, time of validity of the license and restrictions of the license.

18. The wireless terminal according to claim 15, wherein said second license file comprises a name of the information, of a file or of an application to be synchronized, a version number, a search path of the file to be synchronized, a description of the file to be transferred because of the synchronizing and other release information.

19. The wireless terminal according to claim 15, wherein said means have been implemented by an application program installed in the wireless terminal.

20. The wireless terminal device according to claim 15, wherein the wireless terminal is one of the following: a terminal device of a cellular network, a WLAN terminal device, a PDA or a palm computer.

* * * * *